ary N. Stone, Waukesha; Thomas W. Lambert, Dousman, both of Wis.

United States Patent [19]

Stone et al.

[11] 4,228,465
[45] Oct. 14, 1980

[54] ANALOG VIDEO CONVOLVER FOR REAL TIME TWO-DIMENSIONAL IMAGE PROCESSING

[75] Inventors: Barry N. Stone, Waukesha; Thomas W. Lambert, Dousman, both of Wis.

[73] Assignee: General Electric Company, Schenectady, N.Y.

[21] Appl. No.: 973,281

[22] Filed: Dec. 26, 1978

[51] Int. Cl.³ .................. H04N 5/14; H04N 5/21; H04N 5/32

[52] U.S. Cl. .................. 358/166; 358/167; 358/111; 250/416 TV

[58] Field of Search ............ 358/167, 166, 162, 160, 358/36, 37, 38, 110–113; 340/146.3 MA; 307/221 D, 293; 328/135; 333/165; 364/515; 128/2 R; 250/416 TV

[56] References Cited

U.S. PATENT DOCUMENTS

| | | | |
|---|---|---|---|
| 3,936,800 | 2/1976 | Ejiri et al. | 340/146.3 MA |
| 3,991,322 | 11/1976 | Rush et al. | 307/221 D |
| 4,074,231 | 2/1978 | Yojima | 340/146.3 MA |
| 4,127,873 | 11/1978 | Katagi | 358/166 |

OTHER PUBLICATIONS

Deeley et al., "Improved Digital Aperture Corrector," *Proceedings of the IEEE*, vol. 121, No. 9, pp. 929–934, Sep. 1974.

*Primary Examiner*—John C. Martin
*Attorney, Agent, or Firm*—Ralph G. Hohenfeldt

[57] ABSTRACT

In a convolver, analog video waveforms for each horizontal line to a raster scanned video monitor are sampled at regular intervals with a high speed shift register such as a charge coupled device to obtain trains of picture elements (pixels) which are transferred line-after-line to a series of registers to thereby delay the lines by the number of register stages used. As the trains are transferred the pixels are simultaneously supplied to delay elements to delay corresponding pixels in each line by a given amount in reference to the individual pixel which is to be convolved at the instant. The delayed pixel signals existing at the instant are variously processed in summing devices and the result is used to act on the individual pixel to convolve it in accordance with the filter function which is desired.

5 Claims, 8 Drawing Figures

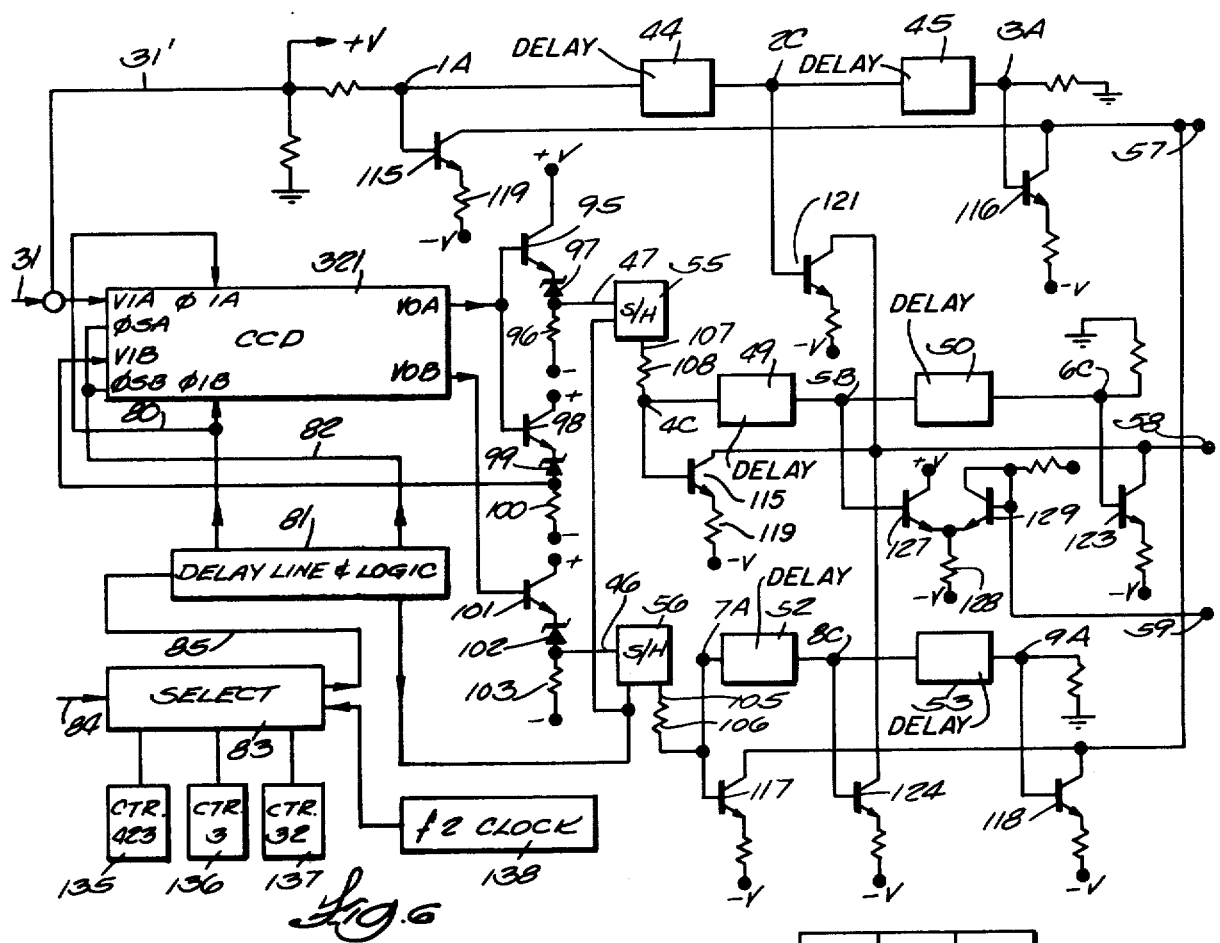
Fig. 6
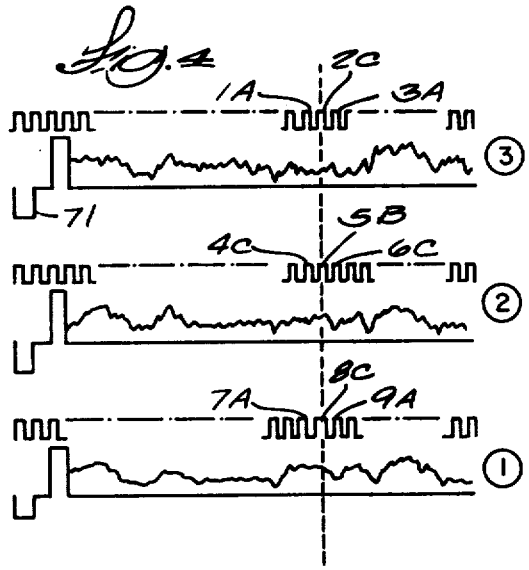
Fig. 4
Fig. 5
| 1A | 2C | 3A |
|----|----|----|
| 4C | 5B | 6C |
| 7A | 8C | 9A |
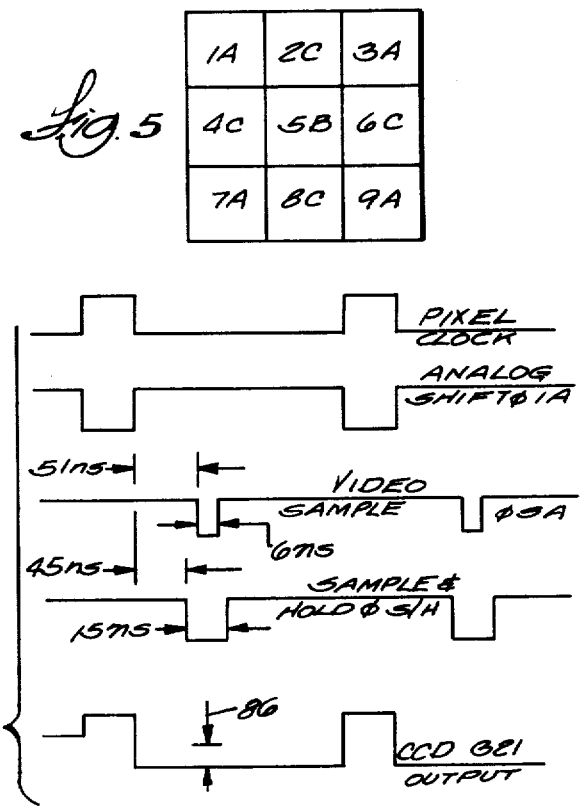
Fig. 7

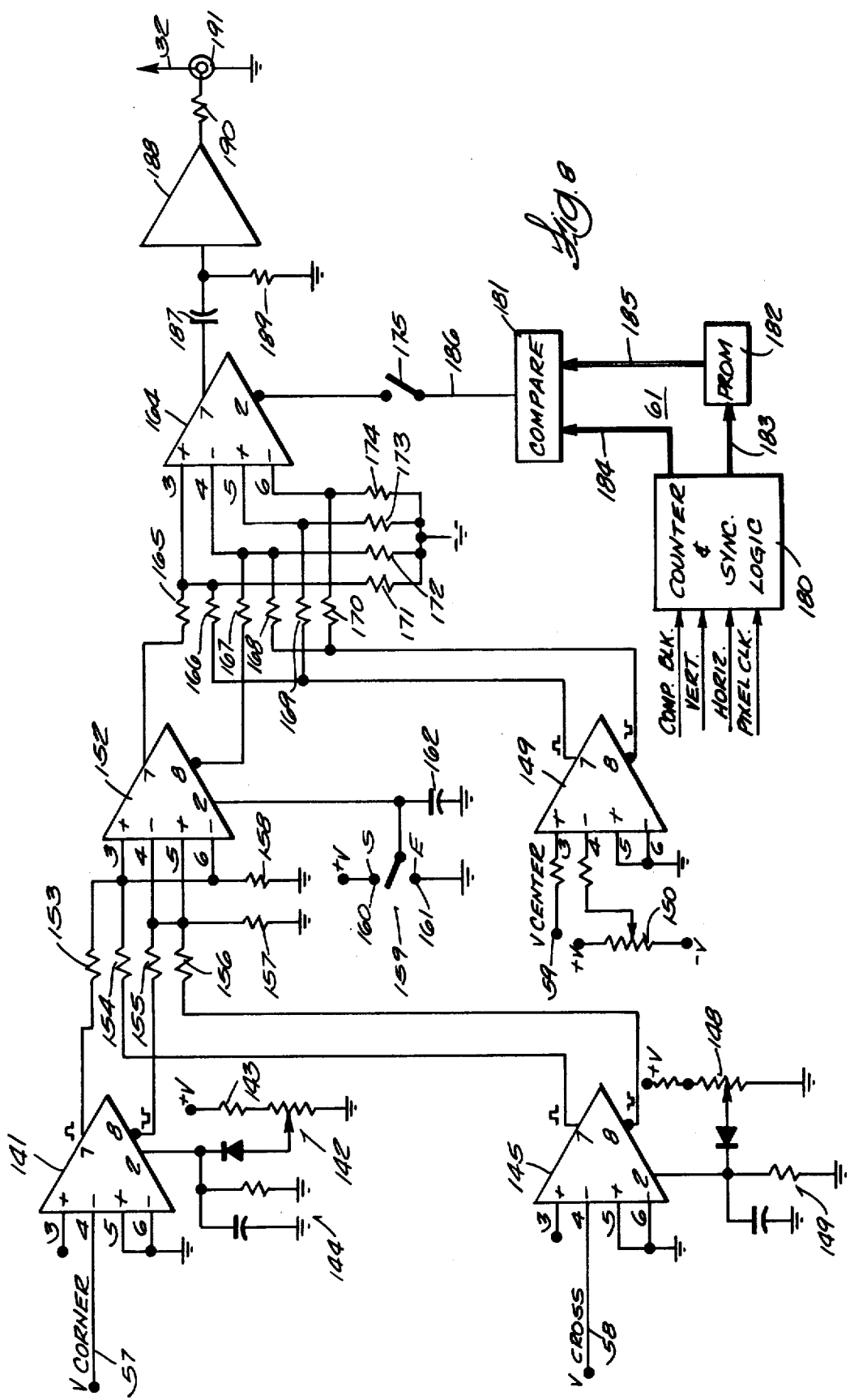

ANALOG VIDEO CONVOLVER FOR REAL TIME TWO-DIMENSIONAL IMAGE PROCESSING

This invention relates to a method and apparatus for modifying the spatial frequency response characteristics of a video display system in real time. The new apparatus is primarily for mitigating the effect of noise in a video display but it can also be used for picture element edge enhancement if desired.

The new signal processor is especially useful in medical diagnostic systems which use a video monitor to display picture information as is done, for example, in ultrasonic, fluroroscopic, optical imaging and computerized tomography (CT) systems. As is well-known, the data for each picture element (pixel) is stored in digital form in a multiple plane digital memory matrix in the display controller after the picture elements have been generated. The display controller is equipped for reading out the digital data on a row-by-row basis corresponding with each monitor scan line. The controller converts the series of digital words in each line to corresponding analog video signal waveforms which are fed to the monitor for producing the picture. The controller generates its own vertical and horizontal blanking and composite blanking pulses for driving the monitor synchronously with matrix readout. There is also a pixel clock in the monitor that enables the outside world to determine which pixel is being read out at any instant.

As is known, the original data obtained in imaging systems and the data that is outputted from the controller is often adversely affected by quantum noise which produces a mottling effect on the display screen and makes interpretation of picture information more difficult for the diagnostician. In systems that use radiation for producing the picture element data, quantum noise results from the statistical distribution of the intensity and density of the sonic, visible or x-radiation that is used to get the data for an image from an object. Noise interferes with visualizing discrete picture elements and it is especially harmful when the contrast between picture elements is rather low. Generally the diagnostician wants to be able to discern the pixels on the display screen since their brightness corresponds with the density of the tissue and bone in a body, for example, and this information may indicate to the diagnostician the condition of the tissue or bone being examined with sonic or electromagnetic radiation such as x-rays. When substantial noise is present, it is desirable to smooth it out since it contains no useful information and is distracting to the observer. This is one of the functions of the new analog video convolver or two-dimensional image processing system. Another function is to enhance or emphasize the edges of each pixel at the option of the user.

One prior method of reducing high frequency quantum mottle or noise is to process the video signal in a bandpass filter operating in the time domain. Bandpass filtering, however, results in loss of some signal strength and in linearity. Another method which has been used by the television broadcasting industry is to sharpen or enhance the edges of the picture elements. Essentially, this amounts to performing a convolution on each picture element or video signal on an element-by-element basis in a single dimension, that is, on each element in each line of pixel data. Single dimensional convolution of picture elements involves treating one or more pixels before and after the pixel of momentary interest in accordance with an algorithm giving various weights to the succession of pixels in the noise category and then subtracting the result from the signal representing the pixel of interest so the residual signal becomes ostensibly noise-reduced and, hence, sharper.

In accordance with the invention, much better pixel definition is obtained by performing a matrix convolution, that is, at least a two-dimensional convolution wherein pixels adjacent the pixel of momentary interest is convolved but, in addition, pixels in the video signal lines preceding and following the pixel of interest in preceding and following lines are also involved in the convolution.

The basis for convolution is that the signals which represent the intensity of the picture elements are each partly made up of noise and of contributions by adjacent pixels. Convolution involves multiplying the pixel signals which are next to the pixel of interest by a correction factor and then adding or subtracting the result from the pixel of interest so it is a pure signal representing true picture information only.

It has been customary to convolve data in computerized tomography (CT) systems on a video line-by-line basis under the control of computer software. In traditional CT applications, a mathematical filter function, called a kernel, is cross-multiplied with pixel signals adjacent the pixel of interest and the result is subtracted from the pixel of interest before it is displayed. In accordance with the present invention, convolution is performed with dedicated hardware.

SUMMARY OF THE INVENTION

The invention will be illustrated primarily in connection with a CT system. Typical of many kinds of image display systems, the image data in a CT system is displayed on a tv monitor using a display controller which writes the video pixel signal line-by-line on a raster scanned cathode ray tube monitor. The new analog video convolver operates on the video signal output from the dispaly controller by precisely delaying the video at least two horizontal lines plus three pixels in the embodiment which is illustrated herein. Discrete delay lines are used to provide separate delays for nine pixels which form a matrix in which the pixel of instantaneous interest is in the center. Each of the pixels in the matrix is acted upon by some scale factor or weighting value determined by the desired filter function and then all scaled pixels are summed with or subtracted from the matrix center pixel. This results in a single center pixel for display that has been convolved. Each pixel in every video line is similarly processed or convolved before it is displayed. The operator is provided with controls which allow selection of any practical degree of data smoothing or edge enhancement.

By using the principles which are demonstrated by the illustrative embodiment of the invention, those skilled in the art should be able to provide circuitry for elaborating the convolution process to include more pixels as, for example, by delaying pixels by five lines and five pixels.

The basic object of the present invention is to provide apparatus for reducing noise, particularly in low contrast areas, in a video display. A further object is to provide for having the same signal processor which is used for smoothing and reduction of noise to achieve edge enhancement or pixel sharpening if desired.

How the foregoing and other more specific objects of the invention are achieved will appear in the ensuing more detailed description of an illustrative embodiment of the invention which will now be set forth in reference to the drawings.

DESCRIPTION OF THE DRAWINGS

FIG. 4 shows three analog video lines for the purpose of explaining convolution of a particular pixel signal;

FIG. 5 is a diagram of a matrix wherein the center pixel, 5B, is the one that is being modified as a function of the convolution function and adjacent pixel values;

FIG. 6 is a more detailed diagram of the first two main stages of an illustrative embodiment of the convolver;

FIG. 7 shows other timing diagrams which are useful for explaining the operation of the convolver; and FIG. 8 is a diagram of the last stage of the convolver before the convolved signals are outputted to the video monitor.

DESCRIPTION OF A PREFERRED EMBODIMENT

As indicated earlier, the convolver may be used with several different kinds of data acquisition and image display systems such as ultrasonics and fluoroscopy. However, the basic concepts of the new convolver will be described in a computerized tomography (CT) system.

Figure 1:
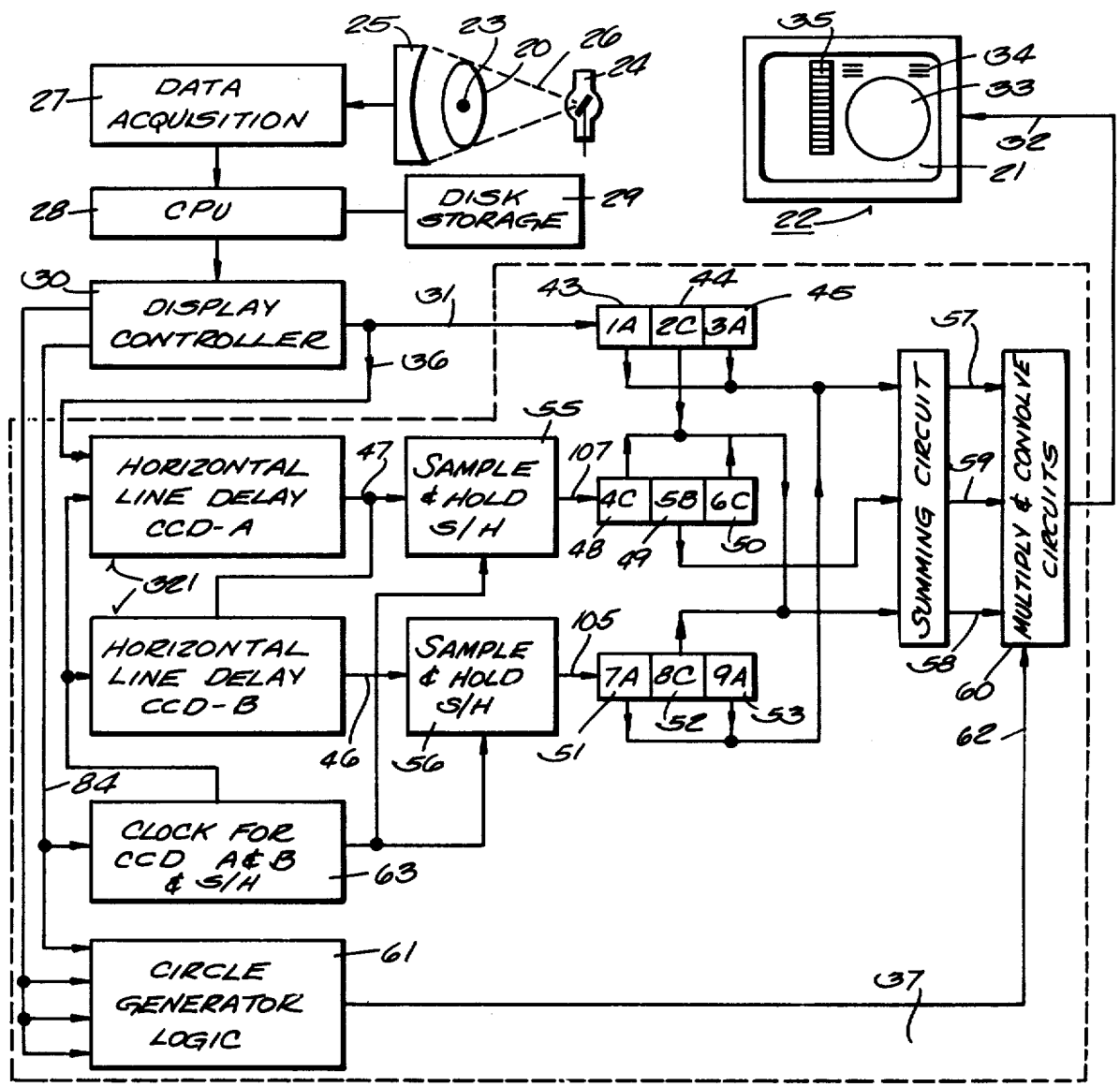
FIG. 1 is a schematic diagram showing some of the main components of a computerized tomography system in conjunction with the new real time multi-dimensional analog video convolver.

Referring to FIG. 1, a body 20 is located in a CT machine for being examined with x-radiation to obtain data for an image that can be reconstructed and displayed on the cathode ray tube 21 of a tv monitor 22. An imaginary axis of rotation 23 extends through the body. There is an x-ray source 24 on one side of the body and a multiple cell detector array 25 on the other side. With a collimator, not shown, the x-ray beam emanating from x-ray tube 24 is shaped into a thin fan-shaped beam whose boundaries are indicated by the diverging dashed lines 26. X-ray tube 24 and detector array 25 are mounted for orbiting the body jointly about axis 23. The x-ray tube 24 is pulsed on and off at regular intervals during orbital movement and each cell in the detector array produces an analog signal representative of absorption of the x-radiation by each small volume element arranged in series along ray paths extending from the x-ray tube to the cells. The absorption data for each incremental angle of rotation by the x-ray source and detector is acquired in data acquisition apparatus 27 which is elementary to CT systems and need not be described.

The absorption data for a complete scan of the body is inputted to a computer (CPU) 28 which is controlled by a suitable algorithm to process the data in such manner that is can be used to display a reconstructed image of the layer of the body which has been scanned by the fan-shaped x-ray beam.

The data for displaying reconstructed images of one or more body layers are customarily stored in a disk storage which is symbolized by the block 29. Thus, the data for any body layer can be transferred from disk storage 29 to a scan converter video display controller 30 under the control of the CPU 28 as required for displaying any particular layer on the screen of video monitor 22.

Everything described thus far is well-known to those familar with CT apparatus. Display controller 30 is conventional. It is characterized by storing digital signals for each of the pixels comprising a picture in a matrix and by converting the digital signals to analog video signals for raster scan or line-by-line display by monitor 22. Display controller 30 also has a pixel clock, not shown, which controls it to read out the stored pixel signals in an orderly synchronized fashion for display. The display controller also produces the horizontal and vertical sync and blanking signals and composite video signals which are required for display by the monitor 22.

Referring further to FIG. 1, in the absence of the new video convolver which lies within dashed line box 37, display controller 30 would deliver the composite analog video signals through its output cable 31 directly to monitor 22 without anything intervening between the controller and the input cable 32 to the monitor. However, in accordance with the invention, every pixel in every analog video signal line is convolved as long as it is within the boundaries of the desired picture on video monitor screen 21. The desired picture, based on convolved pixels, is circular in this example and is marked 33 where it appears on monitor screen 22. For instance, alphanumeric data represented by the lines 34 on the screen is not convolved since convolution would affect its clarity. Data for a gray scale reference 35 which is displayed adjacent the picture and is outputted by display controller 30 is also not convolved. How convolution by convolver 37 is restricted to data comprising the actual x-ray picture 33 will be discussed later.

By way of example and not limitation, and in the interest of clarity that results from using actual numbers in place of generalities, we may assume that in any horizontal video line there will be 450 pixel clocks and, a capability of displaying 360 pixels across the screen 21 in each line but there are only 320 pixels across the maximum diameter of circular picture 33 which is the visually perceivable reconstructed x-ray image. In the present example, the pixel clock pulse frequency is about 9.13 mHz which amounts to one clock pulse every 109 nanoseconds (ns). The 109 ns rate is called frequency 1 or, abbreviated f1 herein.

Referring to FIG. 1, the analog convolver system 37 operates on the video signal by precisely delaying the video 2 horizontal lines plus three pixels in this example. As mentioned earlier, the system can be elaborated to delay for more lines and more pixels, however. To obtain the delay of two horizontal lines, a type CCD 321A charge coupled device shift register is used. It has two 455-bit registers or stages on the same chip. The registers are marked CCD-A and CCD-B to indicate registers A and B, respectively in FIG. 1 where they are also designated jointly by the numeral 321. To obtain the two horizontal line delay, the composite analog video signal from display controller 30 is supplied to the input of register A by way of a line 36. For every clock pulse, a sample is taken of the video waveform by CCD 321. The sample is termed a charge packet which has a magnitude corresponding with the amplitude of the analog video signal corresponding with a pixel at sampling time. Each video line is repeatedly sampled over its entire length in this manner and the samples are advanced through the register A clock pulse by clock pulse until the register A is filled with the data from one analog video signal line. That is the data for one horizontal scan line on video monitor 22. Consider the analog video signals for three horizontal lines. Simultaneously with feeding the data through register A for the first line, the same data is fed to three horizontal delay elements which are marked 43, 44 and 45 and also 1A, 2C and 3A to indicate the pixels to which they relate. As the pixel signals for the first video line under consideration are passing successively through delays 1A, 2C and 3A for the first line, register A in CCD 321 is being filled. Then the next or second video line is clocked into register A and the first video line is clocked out and into register B. At the same time, the second video line is passing through delays 43–45. Now the third video line comes along and fills register A and the second video line from register A is transferred to register B. Thus, in register B of CCD 321, charge packets, or signal voltages corresponding with them, for the first line under consideration are coming out on output line 46 while charge packets from the second video line are being outputted on line 47 from register A. Thus, the output signals from register B will be delayed two video lines from the analog signals that are passing through delays 43–45 at any given instant and the output from register A will be delayed one video line from the real time video line which is passing through delays 43–45. There are two more sets of delay elements one of which is marked 48–50 and 4C, 5B and 6C, respectively. The other is marked 51, 52 and 53 and 7A, 8C and 9A, respectively. It will be shown that the delay elements allow for looking at nine charge packets or pixel signals at a time with, at any instant, the center pixel 5B, shown diagrammatically in the FIG. 5 matrix, being the pixel undergoing convolution and the other pixels being those which lead and follow pixel 5B by one video line and three pixels and which are operated on in connection with each convolution.

Note in FIG. 1 that the pixel signals delivered from registers A and B pass into sample and hold (S/H) circuits 55 and 56, respectively on their way to the delay lines. The sample and hold circuits permit sampling the outputs from the delay registers A and B between clock pulses so clock feed through noise is eliminated from the processed pixel signals as will be explained in greater detail later.

As shown schematically in FIG. 1, the pixel signals which are now delayed by two video lines plus three pixels are fed to a circuit represented by a block labeled summing circuit where they are summed to get the sum of 1A, 3A, 7A and 9A and 2C, 4C, 6C and 8C in the matrix of FIG. 5 while pixel 5B is not operated on at all at this juncture. The A, B and C groups of signals for the corner, center and cross positions in the matrix are then inputted by way of lines 57, 59 and 58 to a multiplying and convolution circuit represented by the block 60 in which the convolution operation actually takes place. The summing circuit along with the delays are shown in greater detail in FIG. 6 and the multiply and convolve circuits 60 are shown in greater detail in FIG. 8. Each convolved output pixel signal from multiplying and convolving circuit 60 which falls within the boundaries of circular visualizable x-ray image 33 is then outputted to monitor 22 on line 32 in proper phase with other data signals which come through without being convolved.

A circle generator logic circuit 61, in FIG. 1, delivers signals over line 62 at appropriate times, as will be explained more explicitly in connection with FIG. 8 so that only pixels which fall within the circular image area 33 will be convolved.

In FIG. 1, a clock or timing circuit is symbolized by the block 63. It provides the timing signals for shifting the pixel signals in the registers 321 and it also provides the signals for sampling the video analog signal at appropriate times. Moreover, clock circuit 63 controls the sample and hold circuits 55 and 56 so that pixel samples are transferred from the CCD registers to the delay lines between pixel clock pulses for the purpose of eliminating clock noise. The main clock for driving clock circuit 63 and keeping the whole system in synchronism is derived from display controller 30.

The convolver 37 will now be described in greater detail beginning with a reference to FIG. 3 which shows one of the analog signals for one video line as it appears when outputted from display controller 30. Each video line starts with the usual horizontal sync pulse 71 which is produced by the display controller 30. In this figure, the signal information for producing the gray scale 35 on the monitor screen is represented by the signal level 72. The analog video signal for the picture within circular area 33 on the monitor screen is marked 73. The horizontal sync pulse for the next video line is marked 74.

Figure 3:
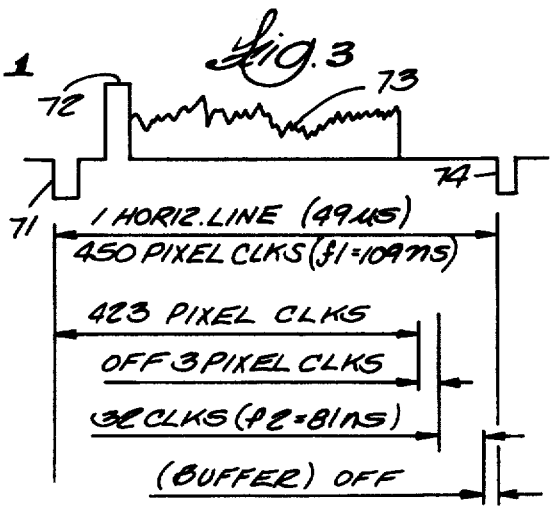
FIG. 3 shows one analog video line and some time relationships which are required for understanding the invention.

Consider FIG. 3 in conjunction with the type 321A charge coupled device marked 321 in FIG. 6. As indicated earlier, in the real device, the two registers A and B which were separately depicted in FIG. 1 and marked CCD-A and CCD-B are represented in the same package in FIG. 6. Each register in CCD 321 has 455 stages which means it can accommodate 455 charge packets or bits of analog video signal information at one time. On the other hand, as can be seen in FIG. 3, in this numerical example, a whole video line would be outputted in 450 pixel clock pulses which are 109 ns apart and designated frequency f1. It is evident then that if the 455 signal per line CCD registers were clocked at the same rate as the 450 signal per line display controller, there would be an additional delay of five pixel clock intervals for each video line and the system would not be properly synchronized. To overcome this, the pixel signals in registers A and B in the CCD 321 are shifted at the pixel clock rate of the display controller 30 for the first 423 pixel clocks as indicated in FIG. 3. This assures that pixel signals are delivered at the pixel clock rate to the video monitor until the end point of the video picture information which is marked 75 in FIG. 3. As will be explained, means are provided for interrupting clocking of the CCD for three pixel clocks or three times 109 ns to let the system settle. Then after the three pixel clocks, as indicated in FIG. 3, the CCD is switched to a higher shift rate f2 at 82 ns for 32 clocks to allow the ouput of the CCD to catch up and be ready to receive a new series of charge packets upon occurrence of the next horizontal sync pulse 74. As indicated in FIG. 3, there is also a two clock period off time at f2 at the end of a line readout which allows the system to settle before the next horizontal sync pulse, such as the one marked 74, occurs.

Refer now to FIG. 6 where the circuitry for obtaining, in this example, a delay of two horizontal lines and three pixels for each pixel signal is shown in greater detail as compared with FIG. 1. At the left of FIG. 6, the composite video signal is fed in from line 31 which comes from display controller 30. The system can be most easily understood by considering FIG. 6 in conjunction with FIG. 4, the latter of which shows how any three lines of video data from the display controller are processed to convolve every pixel within the image circle 33 on monitor screen 21. Three typical lines of video signal samples are depicted in FIG. 4. Each line is marked with an encircled number 1, 2 or 3. The samples are depicted as uniform height square waves but they would more likely have different amplitudes in most cases.

CCD 321 in FIG. 6 has an input pin V1A to which the composite analog video signal is fed for entry into the A register. The analog video signal coming in on line 31 from the display controller output is sampled repeatedly as, for instance, every 109 ns or for 455 pixel clock pulses. For every sample, a charge packet corresponding with the magnitude of the analog video signal at sampling time is entered into the register. The charge packet signals are depicted above the video waveforms in FIG. 4 as having equal magnitudes for drawing convenience as previously indicated. Sampling by the CCD occurs when a pixel clock pulse is delivered to its pins ϕSA and ϕSB over line 80 which leads from a delay line and logic device 81. The register stages are shifted with pulses delivered over line 82, leading from delay line and logic block 81, to pins marked ϕ1A and ϕ1B of CCD 321.

FIG. 7 shows the timing diagrams for CCD 321 and sample and hold circuit 55 and 56 control pulses. Circuit timing is based on the pixel clock pulse rate provided by the display controller 30. In FIG. 6, the pixel clock pulses are delivered to a block 83 marked select over a line 84 which comes from the display controller 30 as can be seen in FIG. 1 also. The pixel clock pulses, shown by the waveform which is labeled pixel clock in the FIG. 7 timing diagrams, occur in this numerical example every 109 ns at f1 and then, by virtue of logic in select block 83, a switch is made to the higher pulse rate f2 of 82 ns rate after entry of the first 423 charge packets and long before occurrence of the next horizontal sync pulse. Normally, the pixel clock pulses go right through select block 83 without having their pulse rate modified which means that the analog shift pulses and sample video pulses depicted in FIG. 7 occur at the pixel clock rate for that interval. Delay line and logic block 81 in FIG. 6 receives clock pulses at whatever rate they are fed to it over line 85 from select block 83. As can be seen in the FIG. 7 timing diagrams, an analog shift pulse is provided over line 80 for every pixel clock pulse delivered from delay line and logic block 81. In this example, 51 ns after the end of the analog shift and pixel clock pulses, a video sample pulse of 10 ns duration is delivered over line 82 so that the composite analog video waveform is entered as a series of discrete charge packets into register A of CCD 321.

The waveform samples are shifted in register A of CCD 321 until they are outputted on its pin marked VOA. The same is true of register B whose signals are clocked out on output pin VOB. The sample signals taken from output pins VOA and VOB are delivered to sample and hold circuits 55 and 56 which are also marked S/H in FIG. 6. As can be seen in FIG. 7, the sample and hold circuits are gated on by pulses occurring 45 ns after the coincident analog shift and pixel clock pulses. The sample and hold pulses endure in this numerical example for 15 ns as marked. As mentioned earlier, the sample and hold pulses are out of phase with the pixel clock and analog shift pulses so that the signals from register output pins VOA and VOB can be taken out in the absence of noise that would otherwise occur if they were taken out coincident with occurrence of the pixel clock and analog shift pulses. The time when the analog signals are taken out is indicated by the arrow 86 in FIG. 7. Note that the sampled video pixel signals are fed to the S/H circuits 55 and 56 at about the midpoint of the 15 ns sample and hold gating pulses and they are also out of phase with the pixel clock and analog shift pulses to obviate noise from the latter.

Consider now how the convolver operates on the video pixel signals by precisely delaying the video by two horizontal lines plus three pixels in the delay and summing circuit which constitutes about the right half of FIG. 6. In the actual circuit as in FIG. 6 only two delay elements 44 and 45 are used to obtain a delay of three pixels so the block 43, among the three delays 1A, 2C and 3A in FIG. 1, is not shown in FIG. 6 since it symbolizes a delay but not an actual delay element. Similarly, only delay elements 49, 50 and 52, 54 for the other lines are shown in FIG. 6. The specific pixel being convolved at the instant is marked 5B in line 2 of FIG. 4. Other pixels involved in convolution of pixel 5B are marked 1A, 2C, 3A, 4C, 6C, 7A, 8C and 9A.

Assume that a video line such as the bottom or first one in FIG. 4 is inputted from display controller 30 by way of line 31 to the input stages of the convolver as in FIG. 6. Video line 1 would go in real time over the continuation 31' of line 31 to the three-interval delay which includes delay elements 44 and 45. In this example, each of these elements produces a 100 ns delay. While the first in the three video lines under consideration is being fed through the delay circuit including elements 44 and 45, charge packet samples of this video line are also being clocked into input pin V1A or register A of CCD 321 but there would be no output for this line on output pin VOA for the moment. Now when the next video line is delivered from the display controller via line 31, it is furnished directly to the delay circuit including delay elements 44 and 45 by way of line 31' and samples of it are also clocked into register A of CCD 321. Simultaneoulsy, due to the analog shift pulses delivered over line 80 to pins ϕSA and ϕSB, the pixel signals of what was formerly the first video line are clocked from register A into register B of CCD 321.

Now when the third video line under consideration enters by way of line 31, its pixel signals are delivered in real time to the delay elements 44 and 45. At the same time, the video signal samples of the third line are fed into register A and the samples from the second video line, which were in register A are now transported through register B of CCD 321.

As indicated, the pixel signals from the third video line in FIG. 6 are available at points marked 1A, 2C and 3A one after another in real time in the delay circuit including delay elements 44 and 45. The signals from the second video line 2 in FIG. 4 under consideration are available from the output, VOA, from register A in the CCD 321 and the signals for the first video line are available from the output pin VOB of register B in CCD 321. Thus, in this embodiment, nine video signal samples that can be considered a matrix as in FIG. 5 are available at the same time that any signal is to be convolved.

The delay and summing network which includes delay elements 44 and 45 has additional delay elements 49, 50 and 52 and 53. The CCD 321 produces the two video line delays and the other individual delay elements produce the three pixel delays for each line. The pixel signals from output pin VOA for register A in the CCD are coupled to the delay circuit including elements 49 and 50 through sample and hold circuit 55. The consecutive pixel signals are fed from output pin VOA of CCD 321 to the base of a transistor 95 which is connected as an emitter follower to produce unity gain. The signal inputted to the sample and hold circuit (S/H) 55 is derived from the drop across an emitter resistor 96 that is in series with a zener diode 97 which assures that the voltage drop produced across resistor 96 will correspond with the voltage level of the pixel signals outputted from pin VOA of CCD 321.

The pixel signals from output pin VOA of register A also drive the base of a transistor 98 which is connected as a unity gain emitter follower and has a zener diode 99 and a resistor 100 in its emitter circuit. It will be evident that when the series of pixel signals are clocked out of register A, they will be coupled through transistor 98 to the input pin V1B of register B in the CCD. The output of the first video line under consideration will be delivered from output pin VOB to S/H 56 and the circuit including delay elements 52 and 53 through a transistor 101 which has a zener diode 102 and an emitter resistor 103 in its emitter circuit so it operates as a unity gain emitter follower.

It will be evident from the foregoing discussion that for any three video lines under consideration as depicted in FIG. 4, the pixel sampls signals from the first video line, marked with an encircled 1 in FIG. 4, will be flowing from the output line 105 of S/H 56 at a 109 ns rate in this example. These signals flow through a limiting resistor 106 and through delay elements 52 and 53 that accomplish the three pixel delay which is in addition to the two video line delay produced by the CCD 321 as described earlier.

The pixel signals from the second video line under consideration, indicated by the line marked with an encircled 2 in FIG. 4, flow from the output 107 of S/H 55 and through a limiting resistor 108 and then through series connected delay elements 49 and 50 where a three pixel delay for the pixels in line 2 is produced.

The pixel signals for the video line marked with an encircled 3 in FIG. 4 are in real time as explained earlier and are inputted to the delay circuit including delay elements 44 and 45 where they are delayed by three pixel clocks.

The process just described affords an opportunity to have nine pixel signals, which have been delayed by as much as two video lines plus three pixels, available at any time. The center pixel, marked 5B in the second video line of FIG. 4 is the one that is undergoing convolution at the instant. Its value is available at the point marked 5B between delay elements 49 and 50 in FIG. 6. The pixel signals 4C and 6C which follow and precede pixel signal 5B in the second line of FIG. 4 are available at points marked 4C and 6C in the delay line circuit which includes delay elements 49 and 50 in FIG. 6.

The pixel signals for the first video line in FIG. 4 which have been delayed by two video lines plus three pixels and which are marked 7A, 8C and 9A in the first video line in FIG. 4 are available at points marked correspondingly in the delay circuit which includes delay elements 52 and 53 in FIG. 6.

The real time pixel signals for the third video line in FIG. 4 and which are marked 1A, 2C and 3A are available at points which are marked correspondingly in the FIG. 6 delay circuit which includes delay elements 44 and 45.

The nine pixel signals which are available at any instant are shown arranged in a matrix in FIG. 5 to facilitate further discussion. As indicated above, pixel 5B is the one that will be convolved at that instant. It will be understood, of course, that every pixel in every video line within the boundaries of the picture or image 33 displayed on the video monitor screen will be convolved at the rate of one per 109 ns in this example, using the clock times that have been adopted herein for illustrating the principles of the invention.

To enable performing convolution, the pixel signals assigned to the corners, namely, 1A, 3A, 7A and 9A of the matrix in FIG. 5 are summed separately. The signals in the cross of the matrix, that is, those marked 2C, 4C, 6C and 8C are also summed separately. After summation, the summed signals are operated on in accordance with a function that will result in the amount of signal smoothing or noise reduction desired by the user of the image display and the summed signals will be added or subtracted to or from the pixel signal 5B which is undergoing convolution at the instant. Summing is accomplished in that part of the circuit in FIG. 6 which includes the delay elements.

In FIG. 6, as alluded to briefly earlier, although there are two delay elements such as 44, 45 and 49, 50 and 52, 53 in the respective delay circuits, three pixels can actually be obtained simultaneously. Assume for example that pixel signals are coming out consecutively from S/H 55 on its output line 107 on their way to the delay circuit which includes delay elements 49 and 50. Considering any pixel to be the first one in a series, it will appear at point 4C and undergo a delay in element 49 so it is delayed once as it reaches point 5B. The same pixel will then be delayed again for a similar time and will appear at point 6C. Upon this event, the next pixel in the series will be at point 5B after having been delayed once. When the next pixel reaches 5B, there will be another pixel signal at 4C so, considering the delay line as a whole, three pixels will all be available at the same time at points 4C, 5B and 6C. The other delay circuits function in a similar manner. In this numerical example, the delay elements cause delays of about 100 ns.

Summing of the signals in the matrix of FIG. 5 is accomplished in FIG. 6 with transistors that have their collectors connected together. The signals in the corners of the matrix, that is, pixel signals 1A, 3A, 7A and 9A are coupled to the base of transistors 115, 116, 117 and 118. Each transistor such as 115 has an emitter resistor 119 connected to negative supply. The collectors of transistors 115–118 are joined at a summing point or line 57 on which a voltage representing the sum of the pixel signal values 1A, 3A, 7A and 9A, or the corners of the matrix appear. In FIG. 6, another group of transistors 121-124 are for summing the signals 2C, 4C, 6C and 8C which are arranged as a cross in the FIG. 5 matrix. The collectors of transistors 121-124 are connected to a summing point or line 59. Thus, a voltage representing the sum of the pixel signals 2C, 4C, 6C and 8C, arranged as a cross in the FIG. 5 matrix, appears.

The center pixel 5B in the FIG. 5 matrix is not summed with any other signal in the FIG. 6 circuit but is operated on in the FIG. 7 multiply and convolve circuit which is in block 60 in FIG. 1. This signal, appearing at point 5B in FIG. 6, simply drives the base of a transistor 127 which is connected as an emitter follower. The voltage level on the top of emitter resistor 128 controls the voltage on the base of a transistor 129 which is connected to a line 59 on which a voltage corresponding with the pixel signal value of 5B appears.

Before discussing the remainder of the convolution process, control of the charge coupled device CCD 321 will be discussed further. Recall that each of the shift registers A and B in CCD 321, which is used in this illustrative embodiment of the invention has 455 stages for handling 455 bits at a time. 455 analog shift clock pulses φ1A would have to be delivered over line 80 from delay line and logic circuit 81 to move all of the sample bits through the 455 stages for outputting them at either pins VOA or VOB. The pixel clock derived from display controller 30 operates at a pulse rate, f1, of one pulse every 109ns or at a frequency of 9.13 mHz. Thus, if CCD 321 were clocked at all times at the scan rate or clock frequency of the display controller, five extra charge packets or pixel signals for each video line as in FIG. 3 would be generated in the CCD between horizontal sync pulses 71 and 74. 450 pixel clocks make up a complete video line from the display controller. The video signal information is terminated at point 75 in FIG. 3 prior to a count of 423 pixel clocks at the 109 ns rate. This affords an opportunity for speeding up the analog shift pulse rate so that a new sequence of video signal samples can be started into registers A and B in synchronism with the initial horizontal sync pulse for the next video line. Thus, the 109 ns, or 9.13 mHz pixel clock from the display controller is fed by way of line 84 in FIG. 6 to select block 83. This block is associated with a plurality of counters symbolized by blocks 135, 136 and 137. The first counter 135 counts off 423 pixel clocks as indicated in FIG. 3. Then counter 136 counts off three more 109 ns pixel clocks during which time there is no output from the select logic block 85 and, hence, no output from lines 80 and 82 of the delay line and logic block 81. After the three counts by counter 136, the logic in select block 83 gates pulses from a clock or oscillator circuit marked 138 which produces clock pulses at a higher frequency, f2, than the 109 ns pixel clock. The period of the f2 clock 138 is approximately 82 ns. A counter stage 137 counts off 32 of these higher frequency clock pulses during which time the f2 clock pulses are gated out of the select logic block 83 and onto line 85 for entering the delay line and logic block 81. Thus, transport of the signals in the registers A and B is speeded up until 455 analog shift signals have occurred in which case a full horizontal line has been stored in the registers within the CCD 321. The sum of the time for the 423 and the three pixel clock pulses at f1 and the 32 clock pulses at f2 is exactly equal to the time between horizontal sync pulses 71 and 74 as illustrated in FIG. 3. Hence, shift register clocking in the CCD 321 is maintained in synchronism with the display controller readout.

It should be noted in the FIG. 6 circuit that there is no stripping of the horizontal nor vertical sync pulse signals nor the blanking signals from the composite video signals as they are processed in the delay and summing circuit. All signals come out in a proper phase relationship on the output 57, 58 and 59. Moreover, there is no loss of information because of the shift to the higher f2 clock frequency.

The remainder of the convolution process will now be discussed in connection with FIG. 8. The summed pixel signals on output lines 57, 58 and 59 for the corner, center and cross signals in the FIG. 5 matrix, are marked 57–59 in FIG. 8 as they are in FIG. 6.

The circuitry in FIG. 8 is for summation and multiplication functions in connection with effecting convolution. The sum of the signals 1A, 3A, 7A and 9A in the FIG. 5 matrix for the corner pixels coming from FIG. 6 is inputted on line 57 in FIG. 8 to an amplifier 141. This amplifier has the properties of a variable gain amplifier and a video switch. A type MC1445 amplifier is used in the actual design but other amplifiers of this general type could be substituted. The gain of amplifier 141 can be varied with a potentiometer 142 that is accessible to the user of the equipment. The potentiometer circuit includes a limiting resistor 143 which is connected to a DC source and a diode and filtering circuit 144. A rotary switch with discrete resistors of different values, not shown, could be used in place of gain control potentiometer 142.

The signals representing the sum of the cross signals in the FIG. 5 matrix are inputted by way of line 58 to another variable gain video switch amplifier 145 which is similar to amplifier 141. Its gain may be varied with a potentiometer 148 which is accessible to the operator. The potentiometer 148 is associated with a RC filter circuit 149. The amplitudes of the summed cross and corner pixel signals in the matrix can be varied independently with potentiometers 142 and 148 which are, respectively, associated with amplifiers 141 and 142.

The center pixel in the matrix is inputted on line 59 in FIG. 8 from similarly marked line in FIG. 6 to another variable gain and video switch type amplifier 149 which is similar to amplifiers 141 and 145. The input offset voltage of this amplifier is compensated with a potentiometer 150 which has its resistive leg connected between the terminals of a DC source.

The summed and amplified pixel signals for the corners of the matrix coming out of amplifier 141 are summed with the summed and amplified pixel signals from the cross of the matrix coming out of amplifier 145 in another amplifier 152 which may be the same type as amplifiers 141, 145 and 149. These amplifiers are all dual differential amplifiers on the input and have control lines for enabling switching on one or the other of the two internal amplifiers which are not visible. The control lines are connected to pin 2 of each of these amplifiers as shown.

Amplifier 141 for the corner signals is used for gain control. The two input pins 5 and 6 to one of the internal differential amplifiers are connected together and grounded as shown so this amplifier is inactive. The other internal amplifier, however, in the dual differential amplifier 141 inputs the corner signal voltages. Considering dual differential amplifier 141 as typical, it is used in a single ended input configuration as mentioned and a differential signal output from its output pins 7 and 8 as indicated by the waveforms adjacent thereto. Pin 8 is the inverted output of amplifier 141. This kind of amplifier is required because of the need for gain control. The differential output signals provide twice the gain or signal amplitude that would be obtainable with a single ended output.

Amplifier 145 for the cross pixel signals has the same properties as the amplifier just discussed. It has differential output pins 7 and 8.

The corner signal from amplifier 141 and the cross signals from amplifier 145 are summed in dual differential amplifier 152. Note that pins 3 and 4 of amplifier 152, which are the inputs of one internal amplifier, are driven through resistors 153-156 to effect summation and that the other internal amplifier is driven separately in the same manner. This permits using the other internal amplifier as a video switch.

The video switch control associated with amplifier 152 is generally designated by the reference numeral 159. It has a terminal 160 connected to positive supply and another terminal 161 which is grounded. It is in parallel with a capacitor 162 which smooths switching transients. Switch terminal 160 is also marked with a capital S to indicate that in this position the switch will effect smoothing of the display image or signals from pixels having sharply rising edges. Terminal 161 of switch 159 is also marked with E to indicate that in this position edge enhancement is achieved. Actually, switch 159 permits obtaining a positive or negative output from dual differential amplifier 152 by switching between its internal amplifiers. Moreover, the output from pins 7 and 8 of amplifier 152 can be put in phase or out of phase with the differential output from amplifier 149 for the center or convolved pixel 5B in the matrix.

For edge enhancement, it is necessary to subtract the corner and cross signals in the matrix from the center pixel 5B out of amplifier 149. To smooth, the cross and corner signals are added to the center pixel.

The amplifier 149 for the center pixel is connected in a single ended input and the amplifier converts to a differential output on its output pins 7 and 8.

The corner, cross and center pixel signals are finally summed in an amplifier 164 which also has dual differential internal amplifiers which make it capable of operating as a dual differential input amplifier and a video switch. The sum of the eight pixel signals outputted from amplifier 152 is added or subtracted as required relative to the center pixel signal which is being convolved and is outputted by amplifier 149. From inspection of the input resistor network comprised of resistors 165-170 and pull-down resistors 171-174, it will be evident that the signals from amplifiers 152 and 149 are combined in one of the internal amplifiers of dual amplifier 164 by inputting these signals to pins 3 and 4 for one of the internal amplifiers in amplifier 164. It will also be evident that the signal from amplifier 149 for the center pixel 5B is inputted independently to input pins 5 and 6 of the other internal amplifier in dual amplifier 164.

Thus, amplifier 164 can be used as a video control which, in this case, means that the convolved pixel signals can be put through one of its internal amplifiers which are fed through input pins 3 and 4 so that its output on its pin 7 will be the entire series of convolved center pixel signals for every video line. In the alternative, amplifier 164 can be switched to make its internal amplifier on input pins 3 and 4 inactive and to make its other internal amplifer on input pins 5 and 6 active. When the amplifier fed with the center signal through input pins 5 and 6 is active to the exclusion of the other internal amplifier, the pixels coming out of output pin 7 are simply the unconvolved pixels which would otherwise be the center pixel in the matrix. The internal amplifiers in dual amplifier 164 can be selected by opening or closing a switch 175 which connects to the control pin 2 of dual amplifier 164. When switch 175 is closed, a logic signal is provided which results in convolution of each pixel occurring. When the switch 175 is open, the pixel go right through amplifier 164 without convolution.

As mentioned earlier, in any case only the pixel signals occurring in time within the circle 33 which represents the image on the screen in FIG. 1 should be convolved. The other information on the screen such as the gray scale reference 35 and alphanumeric data 34 should not be convolved. In this embodiment, the image circle 33 on the screen has a maximum horizontal diameter of 320 pixels as taken from the display controller.

To limit convolution to pixels falling within image circle 33, the system as seen in FIG. 8 is provided with a logic system which is generally designated by the numeral 61 in FIGS. 1 and 8 and which dictates that pixels in any of the video lines should have their convolution begun at one edge of the image circle 33 and ended at the other. The logic system includes a counter and sync logic circuit which is symbolized by the block 180 in FIG. 8. The circuit further includes a comparator 181 and a programmable read-only memory (PROM) 182. PROM 182 has the radius of circle 33 written into its memory matrix. It is addressed by counter and sync logic circuit 180 by way of address bus 183. The counter and sync logic circuit has the pixel clock, horizontal sync, vertical sync and composite blanking video signals from display controller 30 inputted to it. As a result, the counter and sync logic circuit can detect the xy coordinates of the pixel signals as they are being read out from the display controller. Thus, the counter and sync logic circuit 180 keeps track of the pixel count whose address is supplied to comparator 181 by way of bus 184. The output of the PROM 182 on a bus 185 is a digital address word that is compared with the address of the pixel being read out in the display controller at any time. These two addresses are compared in comparator 181. Every time there is a comparison, a logic signal is outputted from the comparator 181 on its output line 186. If when there is coincidence or a comparison, and switch 175 in line 186 is closed manually, amplifier 164 will be enabled to perform the convolution of the pixel which is being read out from the display controller. As the sweep continues across the image circle 33 and the pixels lying within it in the display controller, it finally reaches the edge of the circle and a non-comparison can be made. Hence, the logic signal from comparator 181 changes state and terminates convolution of pixel signals after the circle 33 is traversed. The remainder of the pixels in any video line after termination of convolution just go through amplifier 164 in an unconvolved state as indicated earlier.

In reality, the PROM 182 has a circle one pixel smaller in diameter than the 360 pixel diameter image circle 33 written into it because the image circle is close to the gray scale 35 but should not touch it. Hence, a shift of one pixel toward the interior of the image circle is made in the PROM so that no convolution will start until the last pixel of the three pixels in the group of three which are delayed is on the edge of the image circle. This does not result in wasting a pixel but only prevents convolution of one pixel at the edge of the image circle.

Referring further to FIG. 8, the convolved pixels from dual differential amplifier 164 are delivered from its single ended output pin 7 through a coupling capacitor 187 to the input of a fast buffer amplifier 188. Amplifier 188 has a resistor 189 in its input across which the convolved or unconvolved pixel signal voltage is developed. The output of amplifier 188 feeds through a resistor 190 to a coax cable connector 191 to which composite video signal input line 32 to monitor 22 is connected.

Figure 2:
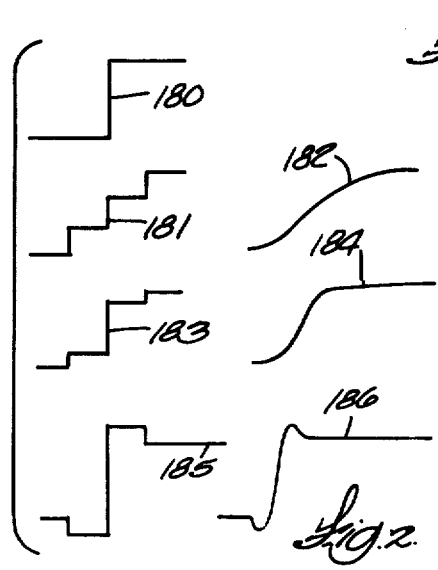
FIG. 2 is a simplified diagram of a line or one-dimensional convolution to illustrate the various kinds of smoothing and edge enhancement which can be achieved for a step function in the new signal processor.

What can be achieved with the convolver is well-illustrated in FIG. 2 where a pixel signal 180, indicated as a step function, can be considered to contain useful picture information and noise. This is a situation that calls for adding to the pixel of interest the properly delayed pixel signals which had been processed in accordance with a desired mathematical filter function. This correction or convolution is attained automatically by the operator adjusting the gain control potentiometers 142 and 148 in FIG. 8 while observing the effect on the video monitor screen. Thus, a single step function 180 can be converted to a number of steps as illustrated in an exaggerated manner by the waveform 181 which, more realistically, is represented by the waveform 182 which is illustrative of maximum smoothing. By other adjustments of the gain control potentiometers 142 and 148, less smoothing can be obtained if desired as suggested by the step function 183 which more realistically gives the type of smoothing represented by the waveform 184.

Step function 185 in FIG. 2 is illustrative of edge enhancement of step function 180. This really amounts to obtaining overshoot in the negative and positive directions of the step function 180 transition. To obtain edge enhancement, switch 159 in FIG. 8 is set to the terminal marked E and gain control potentiometers 142 and 148 are adjusted to obtain maximum sharpness of the pixels being displayed. Of course, edge enhancement does not reduce quantum noise or mottling and may even emphasize it.

In summary, every pixel signal, such as the one marked 5B in the set of nine used for illustration in connection with FIG. 4, can be convolved because every signal in the line marked with an encircled 2 is a 5B and relates in the space domain to eight other signals, one ahead of it and one behind it as 4C and 6C in line 2 and six signals in the preceding and following lines marked with encircled 3 and 1, respectively. Every pixel which is to be convolved is convolved within 109ns in this example.

Those skilled in the art will appreciate that if one wanted to extend the two-dimensional convolution process to obtain more smoothing or edge enhancement or flexibility than is obtainable by convolving one pixel at a time as a function of eight related pixels as described above, a suitable matrix similar to FIG. 5 could be developed. For instance, the delays could be extended from two video lines and three pixels as for FIG. 5 for a 3×3 matrix to four video lines and five pixels to obtain a 5×5 matrix of signals for summation with the central pixel in the matrix to convolve it. It becomes simply a matter of using an additional dual register charge coupled device and making suitable increases in the numbers of delay elements in its output lines and putting in more sample and hold devices and summing and multiplying devices as required. Generally, any number of video line delays and delays of the individual pixels, as required, should be obtainable by those skilled in the art.

We claim:

1. A real time two-dimensional analog video convolver for modifying picture element (pixel) signals in a system including a video monitor for displaying a picture composed of successive horizontal lines of pixels, said monitor having composite video signal input means, said system further including display controller means for storing pixel signals representative of a picture to be displayed and operative to convert said pixel signals to analog video signals for successive horizontal lines, said controller being operative to provide the composite video waveform signals including synchronizing signals for controlling the monitor and to provide pixel clock pulses to enable reading out the stored pixel signals in phase with their display by the monitor, said controller having output means for said composite video signal; said convolver comprising:

a series of shift register means of the charge coupled type each having a predetermined number of stages and each having input and output means, the input means of the first register in the series being for coupling to the output means of said display controller, the output means of each register being coupled to the input means of said next register in the series, means synchronized by said clock pulses for supplying sample clock pulses and shift clock pulses to said shift register means, said register means responding to said sample clock pulses by taking a series of successive samples of the voltage of said video signal waveform for a horizontal line and responding to said shift clock pulses by transporting said samples through the stages of said register, said series of samples from the first register being clocked repeatedly to the next register to enable the first register to obtain the next series of samples in phase with the samples in the next register, the series of samples in each said next register thereby being increasing delayed with respect to a preceding register for the time of a video signal series and the samples in said first register being delayed for the time of one video signal series relative to the next video signal waveform which will occur in real time, the number of stages in each of said shift registers exceeding by the same amount the number of pixels that are required to fill a horizontal line across the display screen of said video monitor, means operative for an interval after the pixel signals constituting the useful part of a video signal waveform for a horizontal line are outputted from said registers and before occurrence of the next horizontal sync pulse to increase the frequency of said shift clock pulses and sample clock pulses so that synchronism of sampling and the horizontal sync pulses will be maintained, a plurality of delay line means each of which is comprised of delay elements and each having input and output means, the input means of said first delay line means being coupled to the output means of said display controller and the input means of others of said plurality of delay line means being coupled to the output means of said registers, respectively, said delay line means each being operative to delay incoming pixel signals for periods of one or more pixels so that there will appear simultaneously at respective delay line output means delayed pixel signals from each horizontal line, said delayed pixel signals being maintained in a predetermined time relationship with each other, first means for summing the majority of pixel signals appearing at any instant in said delay line output means, means for optionally varying the magnitudes of said summed signals either negatively or positively, second means for summing said summed signals with a selected one of the pixel signals from one of the delay elements to modify said one signal, said second means for summing said signals and said selected one signal comprising a dual differential amplifier and video switch device, a control terminal on said device for applying two signal states, said device responding to a signal of one state by passing said center signal without convolving it, that is, without summing it with said summed signals and responding to another state by convolving said one pixel signal, means for defining the boundaries of the picture on the screen of said monitor within which said pixels are to be convolved, said last named means comprising a memory defining the pixels which are to be convolved, counter and sync logic circuit means for counting pixel signals constituting each video signal waveform for each horizontal line and for addressing said memory means, comparator means responding to coincidence between the locations of pixels in said waveform and in said memory by changing the state of said control terminal for said device so as to effect convolution of the center pixel, and means for coupling the modified signal to said video signal input of the monitor.

2. A real time two-dimensional analog video convolver for modifying picture element (pixel) signals in a system including a video monitor for displaying a picture composed of successive horizontal lines of pixels, said monitor having composite video signal input means, said system further including display controller means for storing pixel signals representative of a picture to be displayed and operative to convert said pixel signals to analog video signals for successive horizontal lines, said controller being operative to provide the composite video waveform signals including synchronizing signals for controlling the monitor and to provide pixel clock pulses to enable reading out the stored pixel signals in phase with their display by the monitor, said controller having output means for said composite video signal; said convolver comprising:

a series of shift register means each having a predetermined number of stages and each having input and output means, the input means of the first register in the series being for coupling to the output means of said display controller, the output means of each register being coupled to the input means of said next register in the series, means synchronized by said clock pulses for supplying sample clock pulses and shift clock pulses to said shift register means, said register means responding to said sample clock pulses by taking a series of successive samples of the voltage of said video signal waveform for a horizontal line and responding to said shift clock pulses by transporting said samples through the stages of said register, said series of samples from the first register being clocked repeatedly to the next register to enable the first register to obtain the next series of samples in phase with the samples in the next register, the series of samples in each said next register thereby being increasing delayed with respect to a preceding register for the time of a video signal series and the samples in said first register being delayed for the time of one video signal series relative to the next video signal waveform which will occur in real time, a plurality of delay line means each of which is comprised of delay elements and each having input and output means, the input means of said first delay line means being coupled to the output means of said display controller and the input means of others of said plurality of delay line means being coupled to the output means of said registers, respectively, the number of stages in each of said shift registers exceeding by the same amount the number of pixels that are required to fill a horizontal line across the display screen of said video monitor, and including means operative for an interval after the pixel signals constituting the useful part of a video signal waveform for a horizontal line are outputted from said registers and before occurrence of the next horizontal sync pulse to increase the frequency of said shift clock pulses and sample clock pulses so that synchronism of sampling and the horizontal sync pulses will be maintained, plural sample and hold circuit means interposed, respectively, between said output means of the registers and the input means of said delay line means, means for gating said sample and hold circuits to transfer sample pixel signals from the respective output means of said registers to the delay line means to which they are coupled only between pixel clock and analog shift pulses, said delay line means each being operative to delay incoming pixel signals for periods of one or more pixels so that there will appear simultaneously at respective delay line output means delayed pixel signals from each horizontal line, said delayed pixel signals being maintained in a predetermined time relationship with each other, means for summing the majority of pixel signals appearing at any instant in said delay line output means, means for optionally varying the magnitudes of said summed signals either negatively or positively, means for summing said summed signals with a selected one of the pixel signals from one of the delay elements to modify said one signal, and means for coupling the modified signal to said video signal input of the monitor.

3. A real time two-dimensional analog video convolver for modifying picture element (pixel) signals in a system including a video monitor for displaying a picture composed of successive horizontal lines of pixels, said monitor having composite video signal input means, said system further including display controller means for storing pixel signals representative of a picture to be displayed and operative to convert said pixel signals to analog video signals for successive horizontal lines, said controller being operative to provide the composite video waveform signals including synchronizing signals for controlling the monitor and to provide pixel clock pulses to enable reading out the stored pixel signals in phase with their display by the monitor, said controller having output means for said composite video signal; said convolver comprising:

a series of shift register means each having a predetermined number of stages and each having input and output means, the input means of the first register in the series being for coupling to the output means of said display controller, the output means of each register being coupled to the input means of said next register in the sereis, means synchronized by said clock pulses for supplying sample clock pulses and shift clock pulses to said shift register means, said register means responding to said sample clock pulses by taking a series of successive samples of the voltage of said video signal waveform for a horizontal line and responding to said shift clock pulses by transporting said samples through the stages of said register, said series of samples from the first register being clocked repeatedly to the next register to enable the first register to obtain the next series of samples in phase with the samples in the next register, the series of samples in each said next register thereby being increasing delayed with respect to a preceding register for the time of a video signal series and the samples in said first register being delayed for the time of one video signal series relative to the next video signal waveform which will occur in real time, the number of stages in each of said shift registers exceeding by the same amount the number of pixels that are required to fill a horizontal line across the display screen of said video monitor, and including means operative for an interval after the pixel signals constituting the useful part of a video signal waveform for a horizontal line are outputted from said registers and before occurrence of the next horizontal sync pulse to increase the frequency of said shift clock pulses and sample clock pulses so that synchronism of sampling and the horizontal sync pulses will be maintained, a plurality of delay line means each of which is comprised of delay elements and each having input and outlet means, the input means of said first delay line means being coupled to the output means of said display controller and the input means of others of said plurality of delay line means being coupled to the output means of said registers, respectively, said delay line means each being operative to delay incoming pixel signals for periods of one or more pixels so that there will appear simultaneously at respective delay line output means delayed pixel signals from each horizontal line, said delayed pixel signals being maintained in a predetermined time relationship with each other, means for summing the majority of pixel signals appearing at any instant in said delay line output means, means for optionally varying the magnitudes of said summed signals either negatively or positively, means for summing said summed signals with a selected one of the pixel signals from one of the delay elements to modify said one signal, and means for coupling the modified signal to said video signal input of the monitor.

4. A real time two-dimensional analog video convolver for modifying picture element (pixel) signals in a system including a video monitor for displaying a picture composed of successive horizontal lines of pixels, said monitor having composite video signal input means, said system further including display controller means for storing pixel signals representative of a picture to be displayed and operative to convert said pixel signals to analog video signals for successive horizontal lines, said controller being operative to provide the composite video waveform signals including synchronizing signals for controlling the monitor and to provide pixel clock pulses to enable reading out the stored pixel signals in phase with their display by the monitor, said controller having output means for said composite video signal; and convolver comprising:

first and second shift register means each having a predetermined number of stages and each having input and output means, the input means of said first register being for coupling to the output means of said display controller, the output means of said first register being coupled to the input means of said second register, means synchronized by said clock pulses for supplying sample clock pulses and shift clock pulses to said shift register means, said register means responding to said sample clock pulses by taking a series of successive samples of the voltage of said video signal waveform for a horizontal line and responding to said shift clock pulses by transporting said samples through the stages of said register, said series of samples from the first register being clocked repeatedly to the second register to enable the first register to obtain the next series of samples in phase with the samples in the second register, the series of samples in said second register thereby being delayed for the time of two video signal series and the samples in said first register being delayed for the time of one video signal series relative to the next video signal waveform which will occur in real time, first, second and third delay line means each of which is comprised of delay elements and each having input and output means, the input means of said first delay line means being coupled to the output means of said display controller and the input means of said second and third delay line means being coupled to the output means of said first and second registers, respectively, the number of stages in each of said shift registers exceeding by the same amount the number of pixels that are required to fill a horizontal line across the display screen of said video monitor, and including means operative for an interval after the pixel signals constituting the useful part of a video signal waveform for a horizontal line are outputted from said registers and before occurrence of the next horizontal sync pulse to increase the frequency of said shift clock pulses and sample clock pulses so that synchronism of sampling and the horizontal sync pulses will be maintained, sample and hold circuit means interposed respectively between said output of the first register and the input to said second delay line means and between said output of the second register and said input to said third delay line means, means for gating said sample and hold circuits to transfer sample pixel signals from the respective output means of said registers to the delay line means to which they are coupled only between pixel clock and analog shift pulses, said delay line means each being operative to delay incoming pixel signals for periods of one, two and three pixels, so that there will appear simultaneously at respective delay line output means first, second and third pixel signals from each horizontal line, means for summing the first and third pixel signals appearing in said first delay line output means with the first and third pixel signals appearing in said third delay line output means, said sum being designated the corner signal, means for summing the second pixel signal appearing in said first delay line output means with the first and third pixel signals appearing in said second delay line output means and with the second signal appearing in said third delay line means, said sum being designated the cross signal, said second signal appearing in said second delay line output means being designated the center signal, means for optionally varying the magnitudes of said cross and corner signals either negatively or positively, means for summing said cross and corner signals with said center signals to modify said center signals, and means for coupling said modified center signals to said video signal input of the monitor.

5. A real time two-dimensional analog video convolver for modifying picture element (pixel) signals in a system including a video monitor for displaying a picture composed of successive horizontal lines of pixels, said monitor having composite video signal input means, said system further including display controller means for storing pixel signals representative of a picture to be displayed and operative to convert said pixel signals to analog video signals for successive horizontal lines, said controller being operative to provide the composite video waveform signals including synchronizing signals for controlling the monitor and to provide pixel clock pulses to enable reading out the stored pixel signals in phase with their display by the monitor, said controller having output means for said composite video signal; said convolver comprising:

first and second shift register means of the charge coupled type each having a predetermined number of stages and each having input and output means, the input means of said first register being for coupling to the output means of said display controller, the output means of said first register being coupled to the input means of said second register, means synchronized by said clock pulses for supplying sample clock pulses and shift clock pulses to said shift register means, said register means responding to said sample clock pulses by taking a series of successive samples of the voltage of said video signal waveform for a horizontal line and responding to said shift clock pulses by transporting said samples through the stages of said register, said series of samples from the first register being clocked repeatedly to the second register to enable the first register to obtain the next series of samples in phase with the samples in the second register, the series of samples in said second register thereby being delayed for the time of two video signal series and the samples in said first register being delayed for the time of one video signal series relative to the next video signal waveform which will occur in real time, the number of stages in each of said shift registers exceeding by the same amount the number of pixels that are required to fill a horizontal line across the display screen of said video monitor, and including means operative for an interval after the pixel signals constituting the useful part of a video signal waveform for a horizontal line are outputted from said registers and before occurrence of the next horizontal sync pulse to increase the frequency of said shift clock pulses and sample clock pulses to that synchronism of sampling and the horizontal sync pulses will be maintained, first, second and third delay line means each of which is comprised of delay elements and each having input and output means, the input means of said first delay line means being coupled to the output means of said display controller and the input means of said second and third line means being coupled to the output means of said first and second registers, respectively, said delay line means each being operative to delay incoming pixel signals for periods of one, two and three pixels, so that there will appear simultaneously at respective delay line output means first, second and third pixel signals from each horizontal line, means for summing the first and third pixel signals appearing in said first delay line output means with the first and third pixel signals appearing in said third delay line output means, said sum being designated the corner signal, means for summing the second pixel signal appearing in said first delay line output means with the first and third pixel signals appearing in said second delay line output means and with the second signal appearing in said third delay line means, said sum being designated the cross signal, said second signal appearing in said second delay line output means being designated the center signal, means for optionally varying the magnitudes of said cross and corner signals either negatively or positively, means for summing said cross and corner signals with said center signals to modify said center signals, and means for coupling said modified center signals to said video signal input of the monitor.

* * * * *